United States Patent
Assi et al.

(10) Patent No.: US 11,591,985 B2
(45) Date of Patent: Feb. 28, 2023

(54) METHOD AND SYSTEM FOR THRUST REVERSER OPERATION

(71) Applicant: PRATT & WHITNEY CANADA CORP., Longueuil (CA)

(72) Inventors: Hamza Assi, Laval (CA); Yusuf Syed, Oakville (CA); Ioan Sabau, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 197 days.

(21) Appl. No.: 17/076,192

(22) Filed: Oct. 21, 2020

(65) Prior Publication Data

US 2022/0120239 A1 Apr. 21, 2022

(51) Int. Cl.
*F02K 1/72* (2006.01)
*F02K 1/76* (2006.01)

(52) U.S. Cl.
CPC ............... *F02K 1/72* (2013.01); *F02K 1/763* (2013.01)

(58) Field of Classification Search
CPC ... F02K 1/76; F02K 1/763; F02K 1/60; F02K 1/605; F01D 25/28; F01D 25/24; F05D 2270/64; B64D 29/08; B64F 5/40; B64F 5/60
See application file for complete search history.

(56) References Cited

U.S. PATENT DOCUMENTS

| | | | | |
|---|---|---|---|---|
| 5,230,213 A * | 7/1993 | Lawson | ..................... | F02K 1/60 244/11 OB |
| 5,775,639 A * | 7/1998 | Fage | ......................... | F02K 1/60 239/265.29 |
| 2004/0068977 A1* | 4/2004 | McKay | .................... | F02K 1/763 60/226.2 |
| 2009/0126340 A1* | 5/2009 | Lair | .......................... | F02K 1/60 29/525.01 |
| 2018/0216573 A1* | 8/2018 | Kopecek | ................... | F02K 1/70 |
| 2019/0293023 A1* | 9/2019 | Guerinot | ................. | F02K 1/605 |
| 2020/0332742 A1* | 10/2020 | Goudard | ................... | F02K 1/72 |
| 2021/0049919 A1* | 2/2021 | Davis | ..................... | G08G 5/025 |

FOREIGN PATENT DOCUMENTS

| | | |
|---|---|---|
| GB | 1200800 A | 8/1970 |
| WO | 2014164238 A1 | 10/2014 |
| WO | 2017216679 A1 | 12/2017 |

OTHER PUBLICATIONS https://web.archive.org/web/20090911221849/https://www.avfacts.com.au/editorial/bgt/index.asp; 2009.*
European Patent Office, Communication re. extended European search report in European patent application No. 21203790.7, dated Mar. 21, 2022.

* cited by examiner

*Primary Examiner* — Todd E Manahan
*Assistant Examiner* — Rodolphe Andre Chabreyrie
(74) *Attorney, Agent, or Firm* — Norton Rose Fulbright Canada LLP

(57) ABSTRACT

There are described a system and method for operating a thrust reverser of an aircraft engine, the thrust reverser having a deployed state and a stowed state. The method comprises placing the thrust reverser in the stowed state when the thrust reverser is in the deployed state, a thrust lever associated with the engine is in a forward position, and the engine is rotating at a speed below an idle speed, wherein hydraulic pressure for stowing the thrust reverser is provided by a pump driven by the engine rotating at the speed below the idle speed.

18 Claims, 9 Drawing Sheets

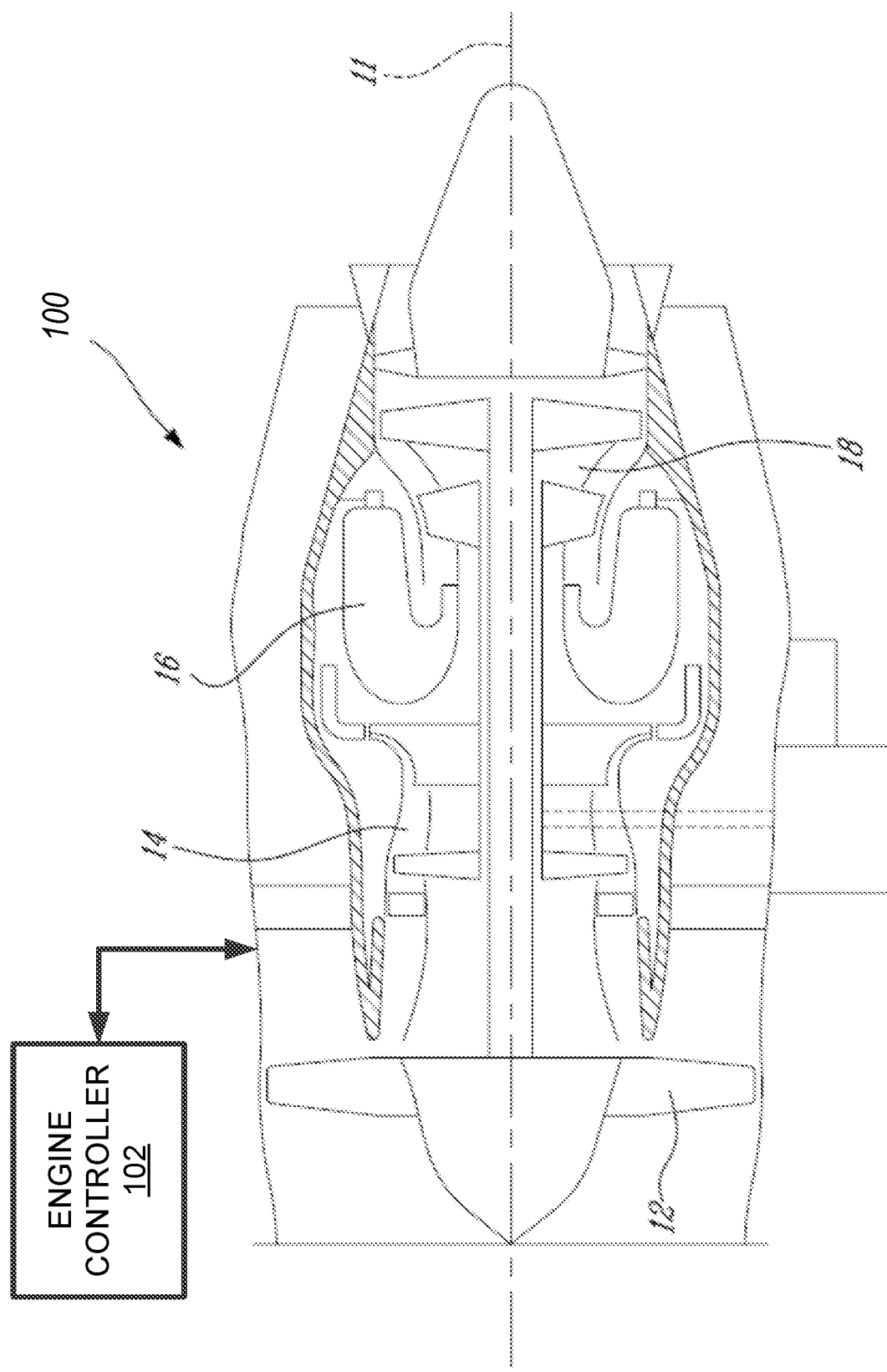

METHOD AND SYSTEM FOR THRUST REVERSER OPERATION

TECHNICAL FIELD

The application relates generally to thrust reversers and, more particularly, to providing hydraulic pressure to deploy and stow thrust reversers.

BACKGROUND OF THE ART

A thrust reverser is used on aircraft engines to allow for more rapid deceleration during landing. By acting against the aircraft's forward movement, the thrust reverser helps the aircraft slow down just after touchdown, reducing wear on brakes and allowing for shorter landing distances. The thrust reverser has two states: deployed and stowed.

A deploy sequence is initiated when a pilot pulls an engine thrust lever into a reverse position while the engine is running. A stow sequence is initiated when the pilot pushes the engine thrust lever into a forward position while the thrust reverser doors are open and the engine is running. The running engine provides hydraulic pressure to deploy/stow the thrust reverser. If the engine is shut down, an external hydraulic pressure cart is used to provide the required pressure to deploy/stow the thrust reverser.

While existing approaches for deploying and stowing a thrust reverser are suitable for their purposes, improvements remain desirable.

SUMMARY

In one aspect, there is provided method for operating a thrust reverser of an aircraft engine, the thrust reverser having a deployed state and a stowed state. The method comprises placing the thrust reverser in the stowed state when the thrust reverser is in the deployed state, a thrust lever associated with the engine is in a forward position, and the engine is rotating at a speed below an idle speed, wherein hydraulic pressure for stowing the thrust reverser is provided by a pump driven by the engine rotating at the speed below the idle speed.

In another aspect, there is provided thrust reverser control system for an aircraft engine comprising a processing unit and a non-transitory computer readable medium having stored thereon program instructions. The program instructions are executable by the processing unit for operating the thrust reverser between a deployed state and a stowed state, and configured for placing the thrust reverser in the stowed state when the thrust reverser is in the deployed state, a thrust lever associated with the engine is in a forward position, and the engine is rotating at a speed below an idle speed, wherein hydraulic pressure for stowing the thrust reverser is provided by the engine rotating at the speed below the idle speed.

DESCRIPTION OF THE DRAWINGS

Reference is now made to the accompanying figures in which:

FIG. 1 is a schematic cross sectional view of a gas turbine engine;

DETAILED DESCRIPTION

Figure 2A:
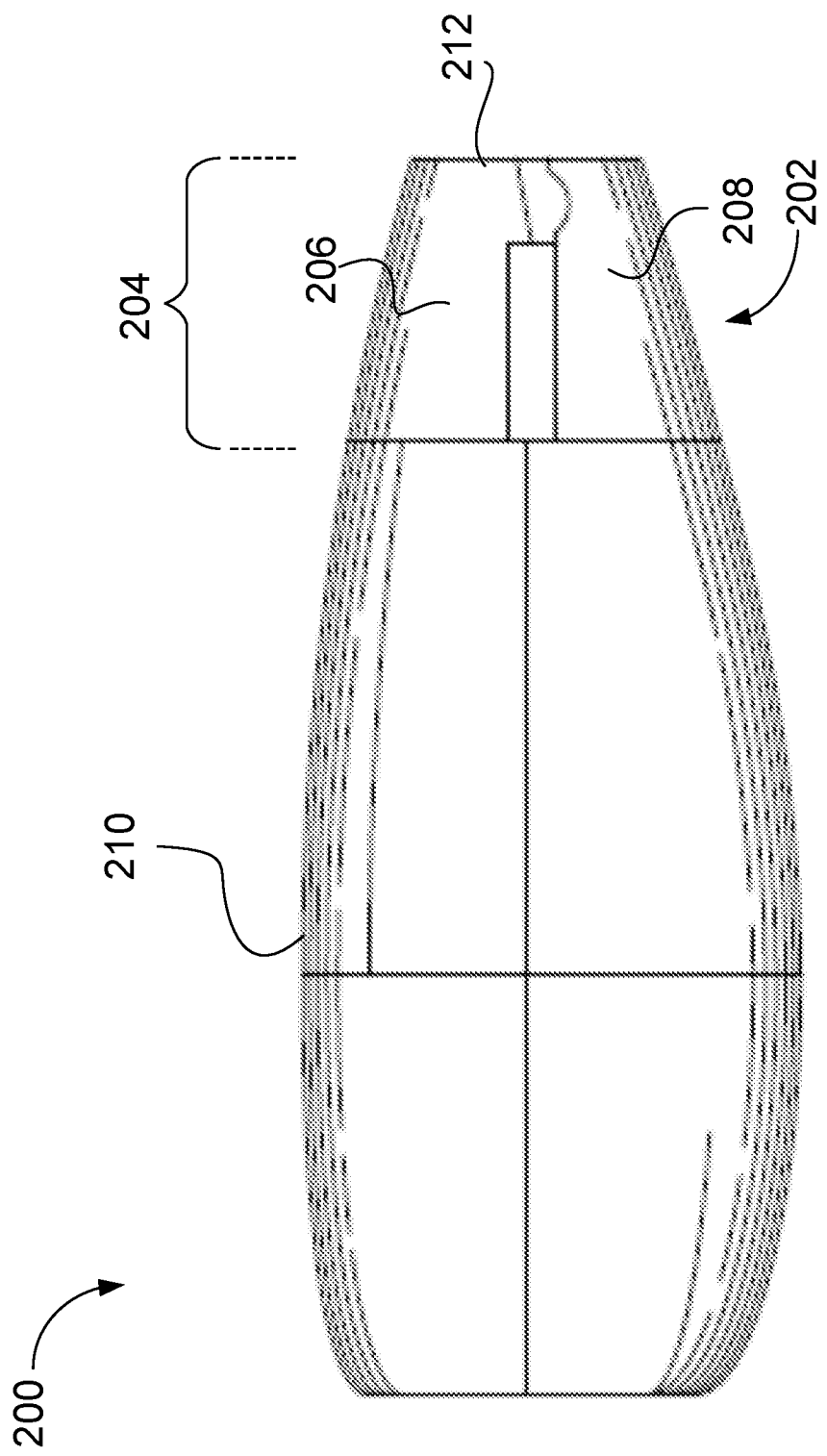
FIG. 2A is side view of an example nacelle with a thrust reverser in the stowed state.

There are described herein methods and system for operating a thrust reverser of an aircraft engine having a deployed state and a stowed state. The thrust reverser may be deployed and/or stowed using hydraulic pressure from a pump driven by an engine rotating at a speed that is below an idle speed, referred to herein as a sub-idle speed. Idle speed is used herein as the lowest available power setting at a given flight condition. The idle speed is achieved when the throttle lever angle (TLA) is at the Idle Stop position. The sub-idle speed is a speed at which there is sufficient power available through the rotation of the engine to drive a hydraulic pump that operates the thrust reverser. In some embodiments, the sub-idle speed is achieved without an engine start. In some embodiments, the sub-idle speed is achieved without fuel being directed to the engine. In some embodiments, the sub-idle speed corresponds to a speed associated with a dry motoring or dry cranking of an engine. In some embodiments, the sub-idle speed is a lowest or minimum speed at which sufficient hydraulic pressure is available for operating the thrust reverser. The sub-idle speed may be a single value or a range of values.

In accordance with the embodiments described herein, if an engine is shut down with the thrust reverser in a deployed state, the thrust reverser may be stowed without having to use a hydraulic pressure cart and without having to restart the engine. This may be used, for example, inside a hangar where engine starts are prohibited and no hydraulic pressure carts are available.

FIG. 1 illustrates a gas turbine engine 100 of a type provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 rotate about a central axis 11.

Control of the operation of the engine 100 can be effected by one or more control systems, for example an engine controller 102, which is communicatively coupled to the engine 100. The engine controller 102 can modulate a fuel flow provided to the engine 100, the position and orientation of variable geometry mechanisms within the engine 100, a bleed level of the engine 100, and the like, based on predetermined schedules and/or algorithms. In some embodiments, the engine controller 102 includes one or more Full Authority Digital Engine Control (FADEC(s)), electronic engine controller(s) (EEC(s)), or the like, that are programmed to control the operation of the engine 100. The operation of the engine 100 can be controlled by way of one or more actuators, mechanical linkages, hydraulic systems, and the like. The engine controller 102 can be coupled to the actuators, mechanical linkages, hydraulic systems, and the like, in any suitable fashion for effecting control of the engine 100.

Figure 2B:
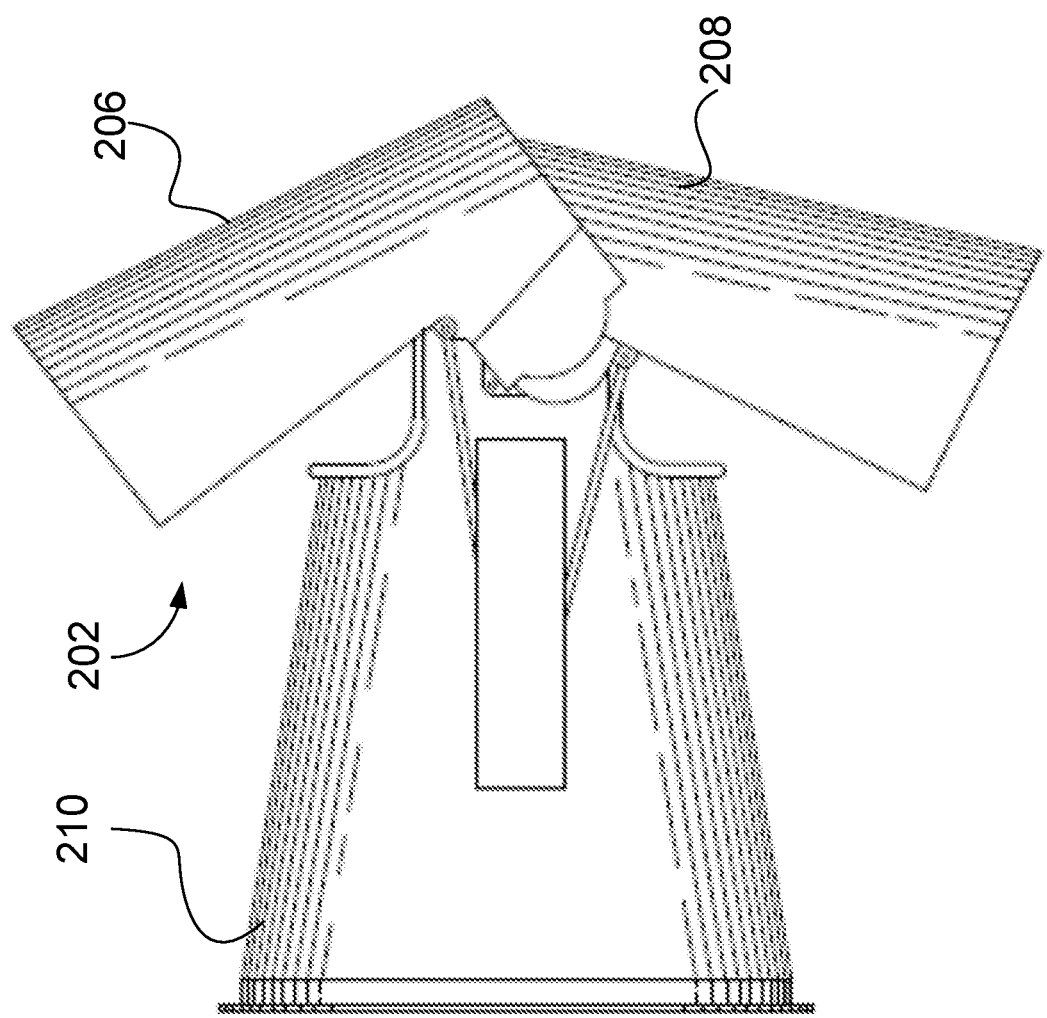
FIG. 2B is a side view of the thrust reverser of FIG. 2A in the deployed state.

In some embodiments, the engine 100 is contained inside a nacelle 200, as illustrated in FIG. 2A. The nacelle 200 may be attached under the wings or on the fuselage of an aircraft using an appropriate arrangement. The nacelle 200 generally comprises a body 210 having a back end 204 that defines an exhaust nozzle 212. A thrust reverser 202 is attached to the body 210 at the back end 204 and used to slow down the aircraft by changing the direction of the engine's fan airflow, thus creating a drag force. In the example illustrated, the thrust reverser 202 is a clam-shell type and comprises two opposite pivoting doors 206, 208. However, the technology described herein is applicable to other types of thrust reversers, as will be readily understood. FIG. 2A shows the thrust reverser 202 in the stowed position, i.e. the doors 206, 208 are aligned with the body 210 of the nacelle 200 to define an outer aerodynamic shape. FIG. 2B shows the thrust reverser 202 in the deployed position, with the doors 206, 208 separated from the body 210 of the nacelle 200.

Figure 3:
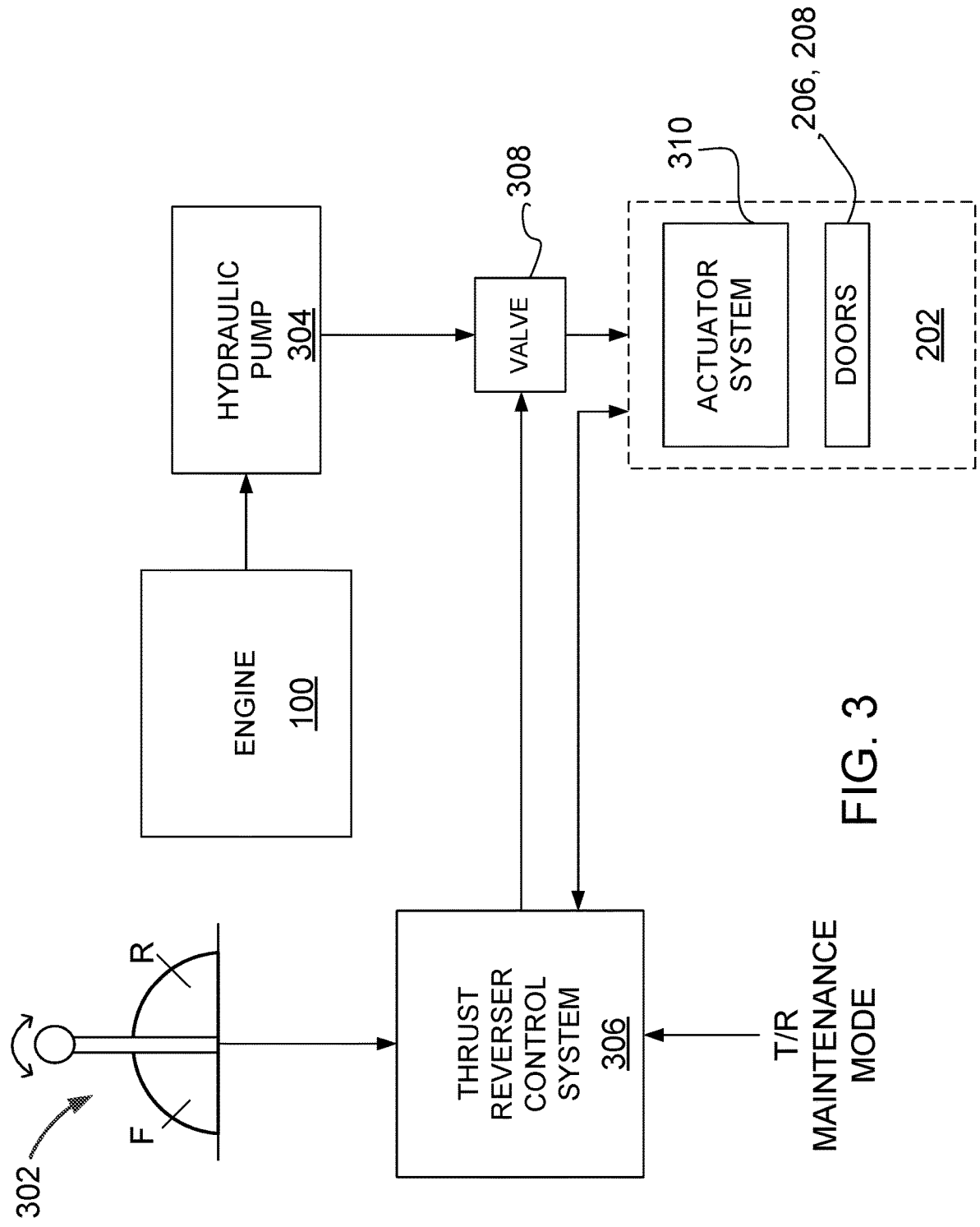
FIG. 3 is a block diagram of an example arrangement for operating a thrust reverser.

Referring to FIG. 3, the thrust reverser 202 may be positioned in the deployed state (as per FIG. 2B) or the stowed state (as per FIG. 2A) using one or more of actuators, pivots and other mechanisms which form an actuator system 310 for displacing the doors 206, 208. A thrust reverser control system 306 energizes a valve 308, which may be an isolation control valve (ICV) or any other type of valve, which when energized allows hydraulic fluid from a hydraulic pump 304 to flow therethrough to the actuator system 310. The hydraulic pump is driven by the engine 100 operating at the sub-idle speed. The thrust reverser control system 306 is operatively coupled to a thrust lever 302 associated with the engine 100, to detect when the thrust lever 302 is in a forward position (F) or in a reverse position (R). The thrust lever 302, which may also be referred to as a power lever or a throttle lever, is the means by which the pilot controls fuel flow to the engine, and may have additional positions to which it can be set. In some embodiments, the thrust reverser control system 306 detects the position of the thrust lever 302 from the TLA indicative of an angle at which the lever 302 is positioned. Other embodiments for detecting a position of the thrust lever 302 will be readily understood by those skilled in the art.

Figure 4A:
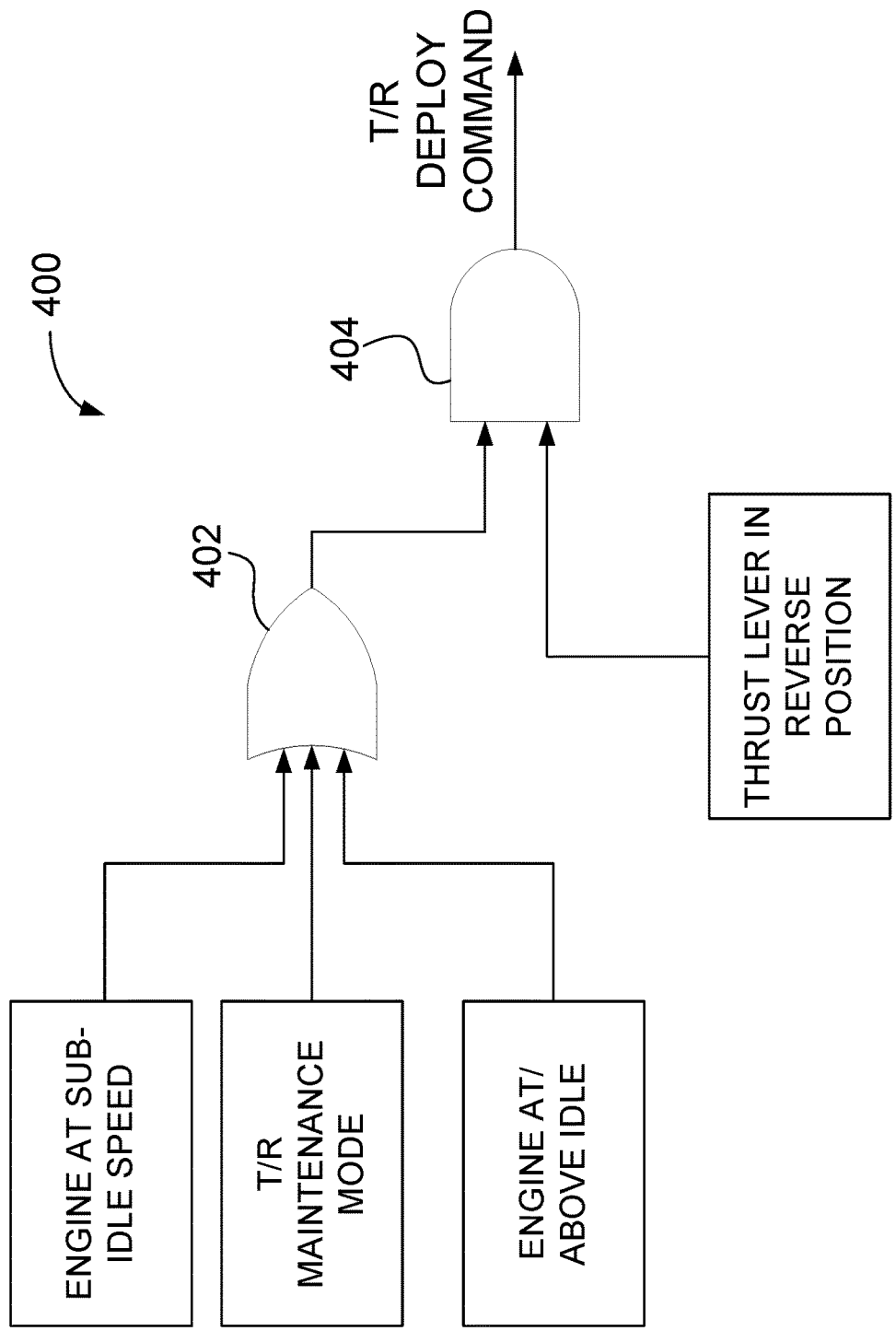
FIGS. 4A-4D are examples of logic sequences for stowing/deploying the thrust reverser.

An example logic sequence 400 for initiating deployment of the thrust reverser 202 is illustrated in FIG. 4A. A deploy command is issued when two deploy conditions are met, such that both inputs of the "AND" gate 404 are high. The first deploy condition, and the first input to the "AND" gate 404, is that the thrust lever is in the reverse position. The second deploy condition, and the second input to the "AND" gate 404, confirms the availability of hydraulic pressure for the actuator system 310 of the thrust reverser 202 to enable operation of the doors 206, 208. A first mode to provide the hydraulic pressure is to have the engine rotating at a speed that is at or above the idle speed, as it is after an engine start when on the ground. A second mode is to have a thrust reverser maintenance mode activated while the engine is off, whereby an external hydraulic pressure cart is used to provide the hydraulic pressure for the actuator system 310. A third mode is to have the engine running at the sub-idle speed. An "OR" gate 402 outputs a signal when any one of the first, second, or third modes for providing hydraulic pressure are detected.

Figure 4B:
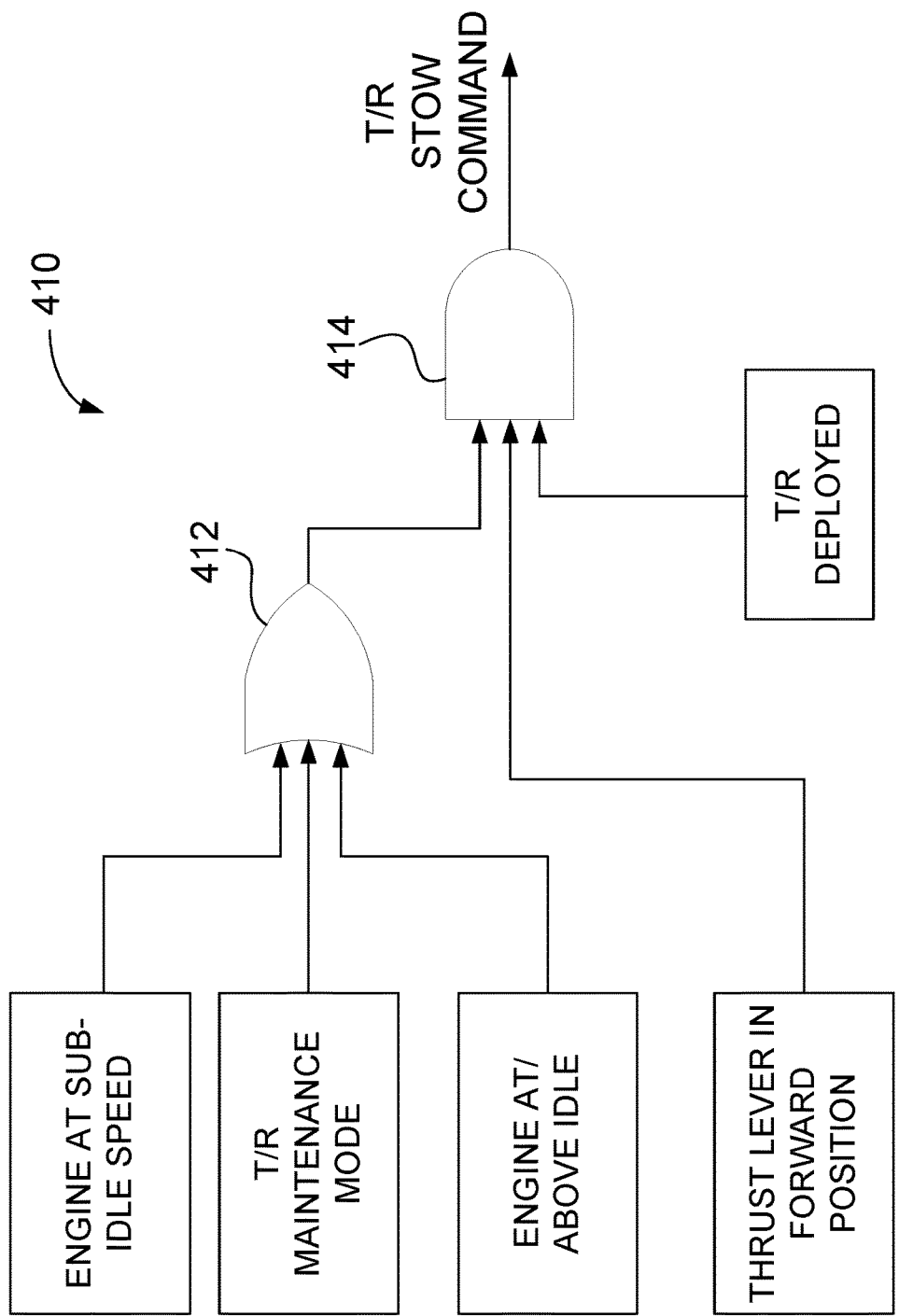

An example logic sequence 410 for initiating stowing of the thrust reverser 202 is illustrated in FIG. 4B. A stow command is issued when three stow conditions are met, such that all three inputs of an "AND" gate 414 are high. An "OR" gate 412 has as its inputs the three possible modes of providing hydraulic pressure for the actuating system 310. A first stow condition is met when any one of the three hydraulic pressure modes is detected. A second stow condition is met when the thrust lever is in the forward position. A third stow condition is met when the thrust reverser 202 is in the deployed state.

Figure 4C:
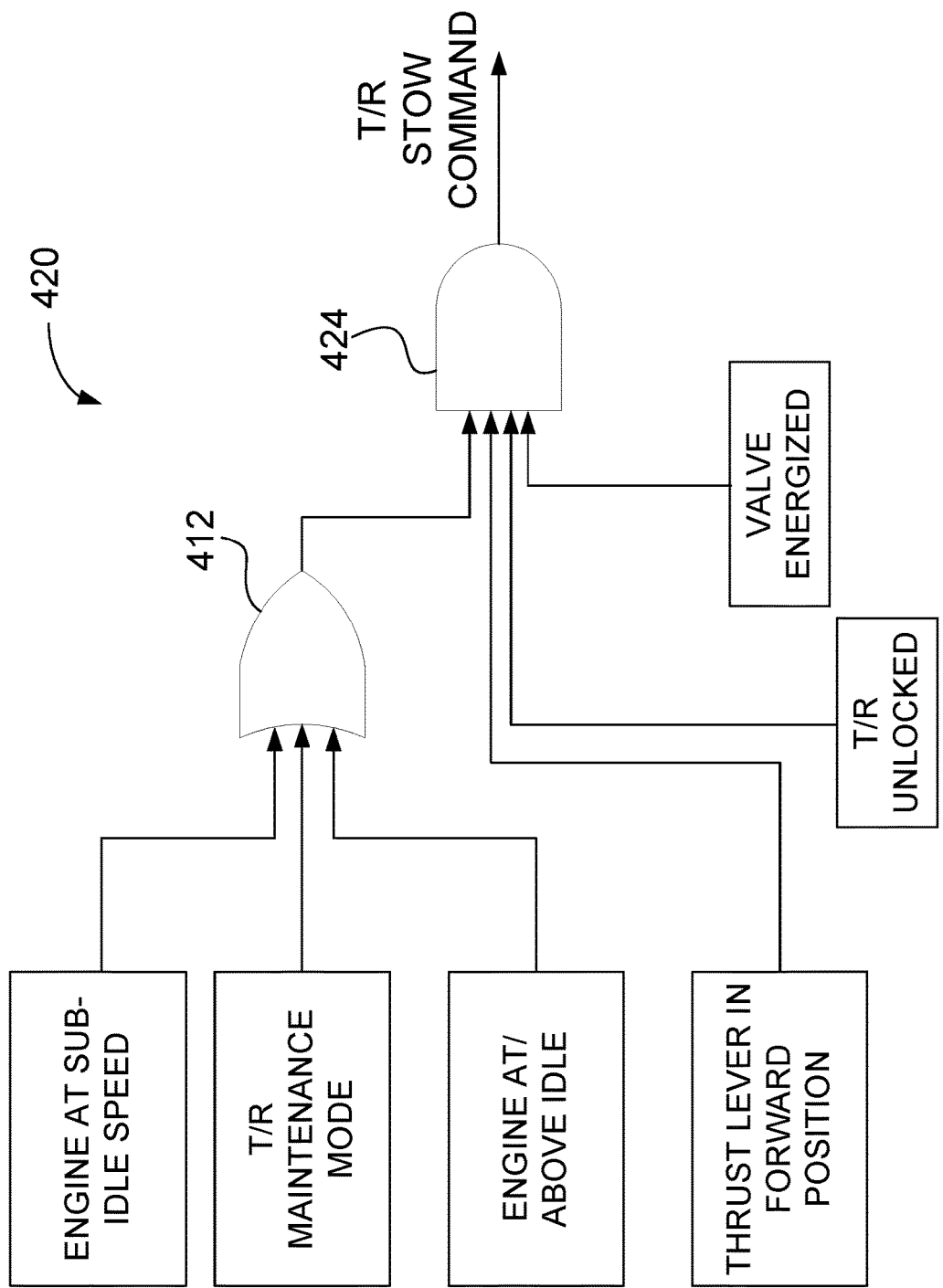

In some embodiments, detecting that the thrust reverser 202 is in the deployed state is done using two different inputs, as illustrated in the logic sequence 420 of FIG. 4C. A first input detects an unlocked state of the thrust reverser 202, a second input confirms that the valve 308 is energized. In this case, a four-input "AND" gate 424 is used to issue the stow command when four stow conditions have been met.

Figure 4D:
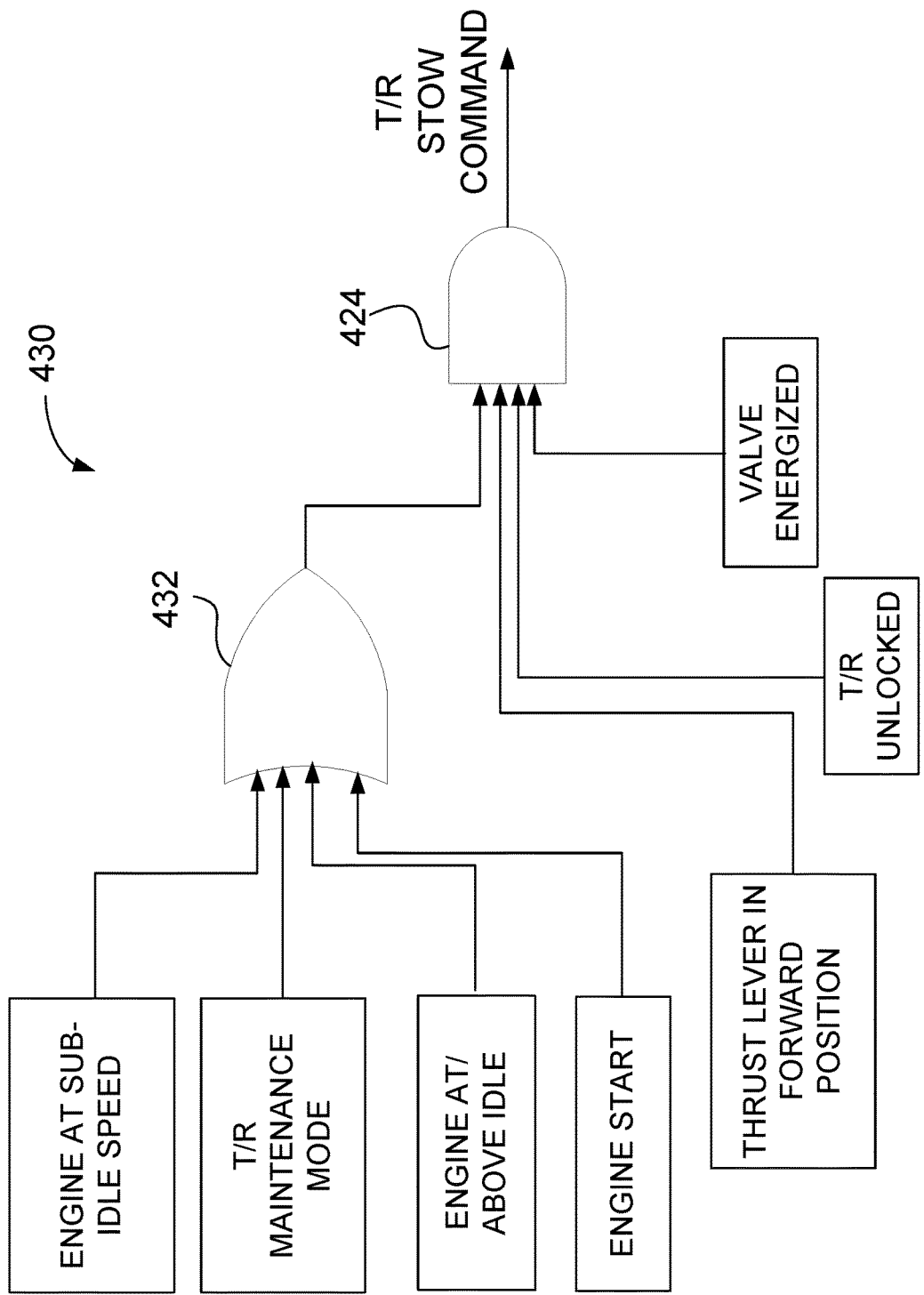

It will be understood that the logic sequences 400, 410, 420 are exemplary only and may vary. Additional conditions may be used to issue the stow and/or deploy commands for safety reasons. For example, and as illustrated in FIG. 4D, a stow logic sequence 430 may include issuing a stow command upon engine start, detected through "OR" gate 432, when the other inputs for the "AND" gate 424 are also detected as high. In some embodiments, engine light-off for the engine start may be delayed until the thrust reverser is in the stowed state. This may be done through a logic sequence in the thrust reverser control system 306 or using other means.

Referring back to FIG. 3, one or more of logic sequences 400, 410, 420 may be implemented inside the thrust reverser control system 306, using hardware and/or software components. The thrust reverser control system 306 detects the forward and/or reverse position of the thrust lever 302 in order to meet either a stow condition or a deploy condition. An additional input to the thrust reverser control system 306 is indicative of a status of the T/R maintenance mode, which may come, for example, from a switch or button in the cockpit of the aircraft or elsewhere.

More generally, the logic sequences 400, 410, 420, 430 represent a method for operating a thrust reverser of an aircraft engine, the thrust reverser having a deployed state and a stowed state. Hydraulic pressure for stowing the thrust reverser and/or deploying the thrust reverser can be provided by a pump driven by the engine rotating at the sub-idle speed. In some embodiments, only stowing of the thrust reverser is enabled using the engine rotating at the sub-idle speed. For example, only logic sequence 410, 412, or 430 is provided in the thrust reverser control system 306, and another logic sequence is used for deploying the thrust reverser that does not include a hydraulic power mode with the engine rotating at the sub-idle speed. Alternatively, both the stow and the deploy logic sequences include a mode to provide hydraulic pressure to the thrust reverser through a pump driven by the engine rotating at the sub-idle speed.

Figure 5:
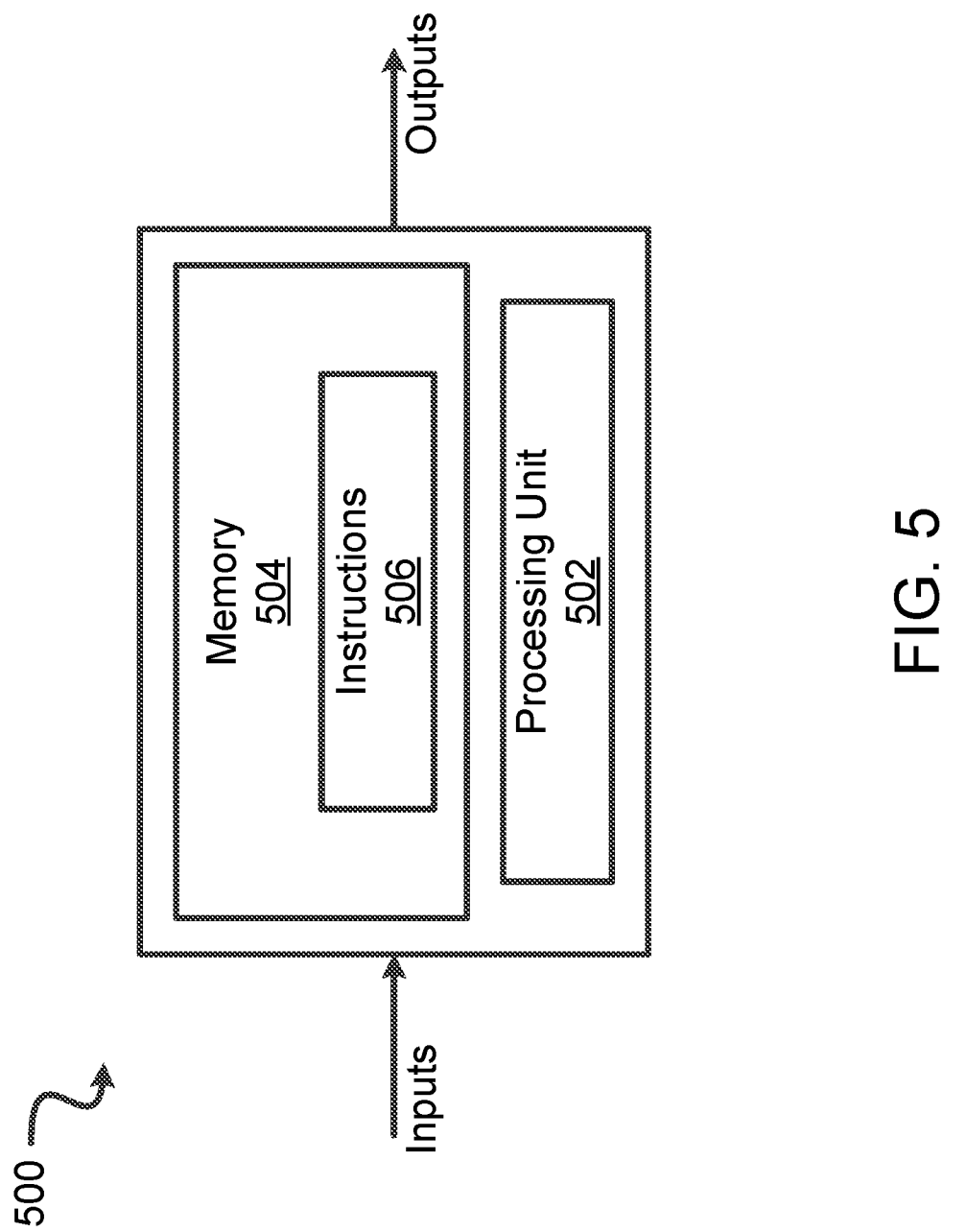
FIG. 5 is a block diagram of an example computing device.

In some embodiments, the thrust reverser control system 306 is implemented in one or more computing device 500, as illustrated in FIG. 5. For simplicity only one computing device 500 is shown but the system may include more computing devices 500 operable to exchange data. The computing devices 500 may be the same or different types of devices. Note that the thrust reverser control system 306 can be implemented as part of a full-authority digital engine controls (FADEC) or other similar device, including electronic engine control (EEC), engine control unit (ECU), avionics or cockpit equipment, electronic propeller control, propeller control unit, and the like. In some embodiments, the thrust reverser control system 306 is implemented as part of the engine controller 102, in part or in whole. In this manner, operation of the thrust reverser 202 may be managed by an engine control system. Other embodiments may also apply.

The computing device 500 comprises a processing unit 502 and a memory 504 which has stored therein computer-executable instructions 506. The processing unit 502 may comprise any suitable devices configured to implement the logic sequences 400, 410, 420, 430 such that instructions 506, when executed by the computing device 500 or other programmable apparatus, may cause the functions/acts/steps performed as part of the logic sequences 400, 410, 420, 430 as described in FIGS. 4A-4D to be executed. The processing unit 502 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

The method for operating the thrust reverser as described herein may be implemented in a high level procedural or object oriented programming or scripting language, or a combination thereof, to communicate with or assist in the operation of a computer system, for example the computing device 500. Alternatively, the method for operating the thrust reverser may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein, for example those described in logic sequences 400, 410, 420, 430.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the ability to use the engine rotating at the sub-idle speed to drive a pump for stowing the thrust reverser may be limited to only dry-motoring, instead of anytime the engine is operating above the sub-idle speed. This would protect against hot starts damaging the thrust reverser doors and ground crew safety issues. Yet further modifications could be implemented by a person of ordinary skill in the art in view of the present disclosure, which modifications would be within the scope of the present technology.

The invention claimed is:

1. A method for operating a thrust reverser of an aircraft engine, the thrust reverser having a deployed state and a stowed state, the method comprising placing the thrust reverser in the stowed state when the thrust reverser is in the deployed state, a thrust lever associated with the engine is in a forward position, and the engine is rotating at a speed below an idle speed, wherein hydraulic pressure for stowing the thrust reverser is provided by a pump driven by the engine rotating at the speed below the idle speed, wherein the engine is rotating without fuel being directed to the engine when rotating at the speed below the idle speed.

2. The method of claim 1, wherein the speed below the idle speed corresponds to a dry motoring speed.

3. The method of claim 1, further comprising placing the thrust reverser in the deployed state when the thrust lever associated with the engine is in a reverse position and the engine is rotating at the speed below the idle speed, wherein hydraulic pressure for deploying the thrust reverser is provided by the engine rotating at the speed below the idle speed.

4. The method of claim 3, wherein the speed below idle speed corresponds to a dry motoring speed.

5. The method of claim 1, further comprising placing the thrust reverser in the stowed state when the thrust reverser is in the deployed state, the thrust lever associated with the engine is in the forward position, and an engine start is detected.

6. The method of claim 5, wherein an engine light-off for the engine start is delayed until the thrust reverser is in the stowed state.

7. The method of claim 1, wherein the thrust reverser is in the deployed state when an isolation control valve is energized and the thrust reverser is unlocked.

8. The method of claim 1, wherein the speed below the idle speed is a minimum speed at which hydraulic pressure for operating the thrust reverser is provided.

9. The method of claim 1, wherein the method is performed by a full authority digital engine control (FADEC) system of the aircraft engine.

10. A thrust reverser control system for an aircraft engine, comprising:
    a processing unit; and
    a non-transitory computer readable medium having stored thereon program instructions executable by the processing unit for operating a thrust reverser between a deployed state and a stowed state, wherein the program instructions are configured for placing the thrust reverser in the stowed state when the thrust reverser is in the deployed state, a thrust lever associated with the engine is in a forward position, and the engine is rotating at a speed below an idle speed, wherein hydraulic pressure for stowing the thrust reverser is provided by the engine rotating at the speed below the idle speed, wherein the speed below the idle speed corresponds to a dry motoring speed.

11. The system of claim 10, wherein the program instructions are further configured for placing the thrust reverser in the deployed state when the thrust lever associated with the engine is in a reverse position and the engine is rotating at the speed below the idle speed, wherein hydraulic pressure for deploying the thrust reverser is provided by the engine rotating at the speed below the idle speed.

12. The system of claim 10, wherein the program instructions are further configured for placing the thrust reverser in the stowed state when the thrust reverser is in the deployed state, the thrust lever associated with the engine is in the forward position, and an engine start is detected.

13. The system of claim 12, wherein an engine light-off for the engine start is delayed until the thrust reverser is in the stowed state.

14. The system of claim 10, wherein the thrust reverser is in the deployed state when an isolation control valve is energized and the thrust reverser is unlocked.

15. The system of claim 10, wherein the speed below the idle speed is a minimum speed at which hydraulic pressure for operating the thrust reverser is provided.

16. The system of claim 10, wherein the engine is rotating without fuel being directed to the engine when rotating at the speed below the idle speed.

17. The system of claim 10, wherein the thrust reverser control system is part of a full authority digital engine control (FADEC) system of the aircraft engine.

18. A method for operating a thrust reverser of an aircraft engine, the thrust reverser having a deployed state and a stowed state, the method comprising:
    placing the thrust reverser in the stowed state when the thrust reverser is in the deployed state, a thrust lever associated with the engine is in a forward position, and the engine is rotating at a speed below an idle speed, wherein hydraulic pressure for stowing the thrust reverser is provided by a pump driven by the engine rotating at the speed below the idle speed; and
    placing the thrust reverser in the stowed state when the thrust reverser is in the deployed state, the thrust lever associated with the engine is in the forward position, and an engine start is detected, wherein an engine light-off for the engine start is delayed until the thrust reverser is in the stowed state.

* * * * *